United States Patent
Shigematsu et al.

(10) Patent No.: US 10,818,898 B2
(45) Date of Patent: Oct. 27, 2020

(54) SEPARATOR FOR ELECTROCHEMICAL ELEMENTS AND ELECTROCHEMICAL ELEMENT INCLUDING SEPARATOR FOR ELECTROCHEMICAL ELEMENTS

(71) Applicant: Mitsubishi Paper Mills Limited, Tokyo (JP)

(72) Inventors: Toshihiro Shigematsu, Tokyo (JP); Masatoshi Kito, Tokyo (JP); Keisuke Ooyama, Tokyo (JP)

(73) Assignee: MITSUBISHI PAPER MILLS LIMITED, Sumida-Ku, Tokyo (JP)

( * ) Notice: Subject to any disclaimer, the term of this patent is extended or adjusted under 35 U.S.C. 154(b) by 67 days.

(21) Appl. No.: 16/098,152

(22) PCT Filed: May 1, 2017

(86) PCT No.: PCT/JP2017/017151
§ 371 (c)(1),
(2) Date: Nov. 1, 2018

(87) PCT Pub. No.: WO2017/195690
PCT Pub. Date: Nov. 16, 2017

(65) Prior Publication Data
US 2019/0148697 A1    May 16, 2019

(30) Foreign Application Priority Data

May 9, 2016   (JP) ................................ 2016-093817
Feb. 27, 2017   (JP) ................................ 2017-034260

(51) Int. Cl.
*H01M 2/16*   (2006.01)
*H01G 11/52*  (2013.01)
*H01G 9/02*   (2006.01)
*H01B 3/48*   (2006.01)

(52) U.S. Cl.
CPC ............ *H01M 2/1626* (2013.01); *H01B 3/48* (2013.01); *H01G 9/02* (2013.01); *H01G 11/52* (2013.01); *H01M 2/16* (2013.01)

(58) Field of Classification Search
None
See application file for complete search history.

(56) References Cited

U.S. PATENT DOCUMENTS

| | | | |
|---|---|---|---|
| 2009/0017385 A1 | 1/2009 | Harada et al. | |
| 2013/0149614 A1 | 6/2013 | Kubo et al. | |
| 2013/0183569 A1* | 7/2013 | Hayakawa | H01M 2/1626 429/144 |
| 2015/0024250 A1* | 1/2015 | Kaji | D21H 25/04 429/144 |
| 2015/0064573 A1 | 3/2015 | Kaji et al. | |
| 2019/0074499 A1 | 3/2019 | Ogawa et al. | |

FOREIGN PATENT DOCUMENTS

| | | |
|---|---|---|
| CN | 101128948 A | 2/2008 |
| JP | H06-231746 A | 8/1994 |
| JP | 2011228320 A | 11/2011 |
| JP | 2012222266 A | 11/2012 |
| JP | 2013179036 A | 9/2013 |
| JP | 2014026877 A | 2/2014 |
| JP | 2015065153 A | 4/2015 |
| JP | 2015176888 A | 10/2015 |
| JP | 2017-157349 A | 9/2017 |
| WO | 2012/008559 A1 | 1/2012 |

OTHER PUBLICATIONS

JP 2015-176888 English Translation. Midorikawa et al. Japan. Oct. 5, 2015. (Year: 2015).*
International Search Report (PCT/ISA/210) dated Sep. 5, 2017, by the Japanese Patent Office as the International Searching Authority for International Application No. PCT/JP2017/017151.
Written Opinion (PCT/ISA/237) dated Sep. 5, 2017, by the Japanese Patent Office as the International Searching Authority for International Application No. PCT/JP2017/017151.
Zhang et al., "Illustration of fibrous materials," Polymer battery membrane, China Textile Press, Aug. 2015, pp. 146-154.
The Second Office Action dated Jun. 29, 2020, by the State Intellectual Property Office of the People's Republic of China in corresponding Chinese Patent Application No. 201780026756.5 and an English translation of the Action. (12 pages).
Notice of Reasons for Refusal dated Jul. 21, 2020, by the Japanese Patent Office in corresponding Japanese Patent Application No. 2017-086956 and an English translation of the Notice. (6 pages).

* cited by examiner

*Primary Examiner* — Christopher P Domone
(74) *Attorney, Agent, or Firm* — Buchanan, Ingersoll & Rooney PC

(57) ABSTRACT

A separator for electrochemical elements includes beaten solvent-spun cellulose fibers and rayon fibers having a fiber diameter of 9.5 μm or less. More preferably, the separator for electrochemical elements has a content of the rayon fibers relative to all fibers of 10 to 25% by mass, and can be applied to electrochemical elements such as electric double layer capacitors, hybrid capacitors, redox capacitors, and lithium secondary batteries. The separator can provide low internal short circuit failure rates and high surface strength.

16 Claims, No Drawings

SEPARATOR FOR ELECTROCHEMICAL ELEMENTS AND ELECTROCHEMICAL ELEMENT INCLUDING SEPARATOR FOR ELECTROCHEMICAL ELEMENTS

TECHNICAL FIELD

The present invention relates to a separator for electrochemical elements and an electrochemical element including the separator for electrochemical elements.

BACKGROUND ART

Since a lithium secondary battery as an electrochemical element has an average operation voltage of 3.7 V which is about three times that of an alkali secondary battery, it is used as an electrochemical element having high energy densities in various applications. Examples of such applications may include cell phones, notebook computers, hybrid vehicles, electric vehicles, and power storage.

Since a capacitor as an electrochemical element has large electric capacity and high stability to repeated charge and discharge, it is being widely used in applications such as power supply sources for vehicles and electrical equipment.

Main members of an electrochemical element are a positive electrode, a negative electrode, a separator for electrochemical elements (hereinafter, sometimes described as a "separator"), and a liquid electrolyte. The separator separates the positive electrode and the negative electrode in the electrochemical element, so that the positive electrode and the negative electrode are not brought into direct contact with each other, that is, for preventing internal short circuits. For reducing internal resistance in the electrochemical element, holes through which electrolyte ions can efficiently pass need to be formed inside the separator. Therefore, the separator needs to be porous.

Known examples of the separator may include a paper separator mainly containing cellulose and a separator mainly containing inorganic fibers represented by glass fibers. Also, there is disclosed a separator including wet laid nonwoven fabrics manufactured by a wet laid paper-making method which contain as essential components synthetic fibers and beaten solvent-spun cellulose fibers (for example, see Patent Documents 1 and 2).

The separator containing as essential components synthetic fibers and beaten solvent-spun cellulose fibers has the advantage that the internal short circuit failure rates are low. However, synthetic fibers and beaten solvent-spun cellulose fibers are both short in fiber length, likely causing insufficient entanglement between fibers. Furthermore, fibrils are generated on the solvent-spun cellulose fibers by beating, and the generated fibrils adhere to each other at points so that a paper layer can be formed. However, since a solvent-spun cellulose is a cellulose having high crystallization degree, it has high stiffness. Accordingly, fibrils themselves are rarely flattened even when pressed in a wet laid paper-making process, and maintain a cross-sectional shape close to a circle. Therefore, when a wet laid fiber web formed by a wet laid paper-making method is dried with a Yankee dryer, and thereafter the dried fiber web peeled from the Yankee dryer, synthetic fibers and beaten solvent-spun cellulose fibers are taken by the Yankee dryer in some cases. As a result, there was the problem that feathers are easily generated on the Yankee dryer surface of the dried fiber web.

A measure for solving this problem is coating the Yankee dryer with a release agent. However, the release agent adhering to the separator may become impurities by decomposing in the electrochemical element. Accordingly, the charge and discharge properties of the electrochemical element were sometimes adversely affected. Also, an excessively large amount of the release agent enhances the peeling of the dried fiber web, but causes the adhesion to the Yankee dryer surface to become partially too loose and peeled. This sometimes led to the occurrence of wrinkles (overlapping streaks which occur obliquely to the flow direction) and dent (a phenomena in which the separator surface becomes uneven). On the other hand, an excessively small amount of the release agent worsens the peeling of the dried fiber web. Accordingly, feathers are also easily generated on the Yankee dryer surface of the dried fiber web.

In the separator having feathers on the surface of the dried fiber web, the feathers sometimes dropped off during slit processing and during the assembling of the electrochemical element, with the result that the accumulated feathers soiled a transfer roll. The electrochemical element is assembled by placing an electrode group including a positive electrode, a separator, and a negative electrode in a case of the electrochemical element, injecting a liquid electrolyte from a liquid inlet, and thereafter sealing the liquid inlet. In such an operation, feathers adhering to the liquid inlet sometimes hindered the sealing.

PRIOR ART DOCUMENT

Patent Document

Patent Document 1: JP-A-2012-222266
Patent Document 2: JP-A-2015-065153

SUMMARY OF THE INVENTION

Problems to be Solved by the Invention

The present invention has been achieved in view of the above-described circumstances, and is to provide: a separator for electrochemical elements which has low internal short circuit failure rates and high surface strength; and an electrochemical element including the separator for electrochemical elements.

Solutions to the Problems

Studies were intensively conducted for solving the above-described problems. As a result, the following was found.
(1) A separator for electrochemical elements including beaten solvent-spun cellulose fibers and rayon fibers having a fiber diameter of 9.5 μm or less.
(2) The separator for electrochemical elements according to (1) described above, in which the content of the rayon fibers relative to all fibers is 10% by mass or more and 25% by mass or less.
(3) The separator for electrochemical elements according to (1) or (2) described above, in which the rayon fibers have a fiber diameter of 5.0 μm or more and 9.5 μm or less.
(4) The separator for electrochemical elements according to (1) or (2) described above, in which the rayon fibers have a fiber diameter of 5.0 μm or more and 8.5 μm or less.
(5) The separator for electrochemical elements according to any one of (1) to (4) described above, in which the beaten solvent-spun cellulose fibers have a modified freeness of 75 ml or more and 220 ml or less.

Modified freeness: a value measured in accordance with JIS P8121-2:2012, except that an 80 wire mesh having a wire diameter of 0.14 mm and an opening of 0.18 mm is used as a sieve plate, and a sample has a concentration of 0.1% by mass (6) An electrochemical element including the separator for electrochemical elements according to any one of claims (1) to (5) described above.

Effects of the Invention

The separator for electrochemical elements according to the present invention includes beaten solvent-spun cellulose fibers and rayon fibers having a fiber diameter of 9.5 µm or less. Therefore, the rayon fibers trap the beaten solvent-spun cellulose fibers by the fiber shape peculiar to rayon fibers and hydrogen bonds while entangling with the beaten solvent-spun cellulose fibers. Accordingly, there can be obtained a separator for electrochemical elements in which the surface strength is high, and feathers on the surface of the dried fiber web surface are suppressed. Also, when the content of the rayon fibers relative to all fibers is 10% by mass or more and 25% by mass or less, there can be obtained a separator for electrochemical elements in which the fluffing of the dried fiber web was hardly caused, and the surface smoothness is high.

Consequently, the separator for electrochemical elements according to the present invention has the advantage that the internal short circuit failure rates are low, the surface strength is high, and feathers are suppressed. Therefore, there can be obtained the effect that failures are less frequent during slit processing as post processing and during the manufacture of an electrochemical element.

DESCRIPTION OF THE EMBODIMENTS

The separator for electrochemical elements and the electrochemical element including the separator for electrochemical elements according to the present invention will be described in more detail.
<Electrochemical Element>

As the electrochemical element in the present invention, a capacitor is suitable. Examples of the capacitor may include an electric double layer capacitor, a hybrid capacitor, and a redox capacitor. Also, as the electrochemical element, a lithium secondary battery is also suitable.
<Electric Double Layer Capacitor>

The electric double layer capacitor (EDLC) is a capacitor which accumulates electric charges in electrical double layers formed on the surfaces of the positive and negative electrodes. The EDLC having larger capacity can be obtained by allowing more ions to adsorb to the surfaces of the positive and negative electrodes. For allowing more ions to adsorb to the surfaces of the positive and negative electrodes, the positive and negative electrodes need to have a larger specific surface area. Also, the positive and negative electrodes of the EDLC need to avoid an electrochemical reaction. As a material satisfying these conditions, activated carbon; graphite; nanocarbon such as carbon nanofibers and graphene; and the like are mainly used for the positive and negative electrodes of the EDLC. Examples of a liquid electrolyte to be used may include: a sulfuric acid aqueous solution; a solution in which a salt to avoid an electrochemical reaction at a use potential is dissolved in a polar organic solvent; and an ionic liquid. Examples of the salt to avoid an electrochemical reaction at a use potential may include a salt of tetraethylammonium and tetrafluoroboric acid ($TEA.BF_4$), a salt of triethylmethylammonium and tetrafluoroboric acid ($TEMA.BF_4$), and a salt of 5-azoniaspiro[4.4] nonane and tetrafluoroboric acid ($SBP.BF_4$). Also, examples of the polar organic solvent may include acetonitrile; γ-butyrolactone (GBL); and carbonic acid esters such as propylene carbonate (PC), ethylene carbonate (EC), diethyl carbonate (DEC), and ethyl methyl carbonate (EMC).
<Hybrid Capacitor>

The hybrid capacitor is a capacitor in which a battery reaction (that is, an electrochemical oxidation-reduction reaction) proceeds in one of the positive electrode and the negative electrode, and electric charges are accumulated in an electric double layer formed on a surface in the other electrode. In the electric double layer capacitor, in which the electric double layer of the positive electrode and the electric double layer of the negative electrode are connected in series, only a half of the capacitance of the electric double layer is obtained in each of the positive electrode and the negative electrode. In contrast to this, in the hybrid capacitor, in which the electrode to accumulate electric charges in the electric double layer is used as one of the electrodes, the capacitance that is about twice that of the electric double layer capacitor is obtained. An example of the hybrid capacitor may include a lithium ion capacitor described later.
<Lithium Ion Capacitor>

The lithium ion capacitor (LIC) is a hybrid capacitor. In the LIC, electric charges are accumulated in the electric double layer in the positive electrode similarly to in the EDLC, and lithium ions are absorbed and discharged in the negative electrode similarly to in the LIB. In the LIC, the monopolar potential in the negative electrode is low similarly to in the LIB, and a potential difference from the positive electrode is large. In other words, the voltage between the positive and negative electrodes in the LIC is high. Accordingly, voltages obtained in the LIC are higher than in the EDLC. Furthermore, although the positive electrode material of the LIC is the same as the EDLC, the capacitance in the LIC as a hybrid capacitor is about twice that in the EDLC. Due to high voltages and approximately doubled capacitance, the energy capacity which can be stored in the LIC is extraordinarily larger than the energy capacity which can be stored in the EDLC. As the positive electrode, activated carbon; graphite; nanocarbon such as carbon nanofibers and graphene; and the like are mainly used. As the negative electrode, a lithium-occluding material is used. Examples of the lithium-occluding material may include carbon-based materials, silicon-based materials, and composite oxides of transition metal and lithium. In terms of low monopolar potentials, a carbon-based material in which metal lithium is previously occluded is preferably used. As the liquid electrolyte, there can be used a solution in which a lithium salt to avoid an electrochemical reaction at a use potential of the positive electrode is dissolved in a polar solvent. Examples of the salt to avoid an electrochemical reaction at a use potential of the positive electrode may include lithium hexafluorophosphate ($LiPF_6$) and lithium tetrafluoroborate ($LiBF_4$). Also, examples of the polar solvent may include carbonic acid esters such as propylene carbonate (PC), ethylene carbonate (EC), diethyl carbonate (DEC), and ethyl methyl carbonate (EMC); and various ionic liquids.
<Redox Capacitor>

The redox capacitor is a capacitor in which the electrode (solid phase) side of the electrode-liquid electrolyte interface is charged by an oxidation-reduction reaction. When compared to the EDLC in which the charge on the electrode side depends on polarization, the charge density on the electrode surface is extraordinarily high, thereby enabling the achievement of high capacity. As the liquid electrolyte, there can be used: a solution in which a salt to avoid an electrochemical reaction at a use potential is dissolved in a polar solvent; and an ionic liquid.

<Lithium Secondary Battery>

The lithium secondary battery refers to a secondary battery in which lithium ions move between the positive and negative electrodes during charge and discharge. Examples of the lithium secondary battery include a lithium ion secondary battery which contains a lithium-occluding material as the negative electrode active material and a metal lithium secondary battery which contains metal lithium as the negative electrode active material.

<Negative Electrode of Lithium Ion Secondary Battery>

As the negative electrode active material of the lithium ion secondary battery, a lithium-occluding material is used. Examples of the lithium-occluding substance may include carbon-based materials, silicon-based materials, and composite oxides of transition metal and lithium. The carbon-based materials are preferably used in terms of a favorable balance between the amount of lithium which can be occluded based on mass and the resistance to the deterioration associated with the absorption and discharge of lithium. Examples of the carbon-based materials may include: graphite such as natural graphite and artificial graphite; amorphous carbon such as hard carbon, soft carbon, and mesoporous carbon; and nanocarbon materials such as carbon nanotubes and graphene. The silicon-based materials are favorably used in terms of a large amount of lithium which can be occluded based on mass. Examples of the silicon-based materials may include silicon, silicon monoxide (SiO), and silicon dioxide ($SiO_2$). Lithium titanate as a composite oxide of transition metal and lithium is favorably used in terms of resistance to the deterioration associated with the absorption and discharge of lithium.

An example of the negative electrode of the lithium ion secondary battery may include an electrode obtained by coating metal foil with a negative electrode material containing the above-described negative electrode active materials. Into the negative electrode material, there can be mixed as necessary: a binder such as polyvinylidene fluoride (PVDF) and a styrene-butadiene copolymer (SBR); a conducting agent such as carbon black and nanocarbon materials; a dispersant; a thickener; and the like. Examples of metal used in the metal foil may include copper and aluminum.

<Positive Electrode of Lithium Secondary Battery>

Examples of the positive electrode active material of the lithium secondary battery may include a composite oxide of transition metal and lithium, a composite salt having an olivine structure of transition metal and lithium, and sulfur. An example of the composite oxide of transition metal and lithium may include a composite oxide of one or more transition metals selected from cobalt, nickel, and manganese, and lithium. Into these composite oxides, there can be further combined: typical metal such as aluminum and magnesium; and transition metal such as titanium and chromium. An example of the composite salt having an olivine structure of transition metal and lithium may include a composite salt having an olivine structure of one or more transition metals such as iron and manganese, and lithium.

An example of the positive electrode of the lithium secondary battery may include an electrode obtained by coating metal foil with a positive electrode material containing the above-described positive electrode active materials. To the positive electrode material, there can be mixed as necessary: a binder such as polyvinylidene fluoride and an acrylic acid ester copolymer; a conducting agent such as carbon black and nanocarbon materials; a dispersant; and a thickener. An example of metal used in the metal foil may include aluminum.

<Liquid Electrolyte of Lithium Secondary Battery>

Examples of the liquid electrolyte of the lithium secondary battery may include a solution containing lithium salt dissolved in a polar solvent and a solution containing lithium salt dissolved in an ionic liquid. Examples of the polar solvent used in the liquid electrolyte of the lithium secondary battery may include: carbonic acid esters such as propylene carbonate (PC), ethylene carbonate (EC), diethyl carbonate (DEC), and ethyl methyl carbonate (EMC); and fatty acid esters such as ethyl acetate, propyl acetate, and ethyl propionate. Examples of lithium salt used in the liquid electrolyte of the lithium secondary battery may include lithium hexafluorophosphate ($LiPF_6$) and lithium tetrafluoroborate ($LiBF_4$).

<Structure of Electrochemical Element>

An electrochemical element generally has a structure in which a positive electrode, a separator, and a negative electrode, as members of the element, are stacked in this order. A liquid electrolyte is absorbed in each of the positive electrode, the negative electrode, and the separator. Examples of the type of the stacked structure may include: a cylindrical type in which constituent members are stacked and thereafter wound into a roll shape; a winding flat (flattened) structure in which the cylindrical type is crushed to form two planes and curved both ends; a zigzag type in which cut sheets of electrodes are inserted into a zigzag folded separator; and a sheet stacked type in which cut sheets of separators and cut sheets of electrodes are stacked.

<Separator for Electrochemical Elements>

As a raw material of the separator for electrochemical elements according to the present invention, beaten solvent-spun cellulose fibers are used. The solvent-spun cellulose fibers indicate cellulose fibers directly dissolved in an organic solvent without undergoing a cellulose derivative. The solvent-spun cellulose fibers are sometimes referred to as "Lyocell (registered trademark)" or "Tencel (registered trademark)". The effect by the beaten solvent-spun cellulose fibers includes improved liquid retaining properties of the liquid electrolyte, reduction in size of pores, and resistance to internal short circuits, due to the fact that fibers form a close-packed structure inside a separator.

In the present invention, the beaten solvent-spun cellulose fibers contain molecules highly arranged in the fiber major axis direction, and are likely to become finer when mechanical force such as friction is applied in a wet state, with the result that thin and long fine fibers are generated. When compared to beaten natural cellulose fibers and bacterial cellulose fibers, the beaten solvent-spun cellulose fibers are unlikely to form a film, and firmly retain a liquid electrolyte between the fine fibers, thereby achieving excellent liquid retaining properties of the liquid electrolyte.

In the present invention, the method for producing the beaten solvent-spun cellulose fibers may include dispersing short fibers of solvent-spun cellulose in water or the like at an appropriate concentration, and beating the dispersion with, for example, a refiner, a beater, a mill, a grinder, a rotary blade homogenizer which provides shearing force by a high-speed rotary blade, a double cylindrical high-speed homogenizer which generates shearing force between a cylindrical inner blade to rotate at high speed and a fixed outer blade, an ultrasonic crusher which performs refinement by ultrasonic impact, and a high-pressure homogenizer which adds shearing force and cutting force to fibers by applying a pressure difference of at least 20 MPa to a fiber suspension causing fibers to pass through a small-diameter orifice with high speed and allowing the fibers to collide with each other to rapidly slow down. The method of beating with a refiner is particularly preferable.

The modified freeness of the beaten solvent-spun cellulose fibers is preferably 75 ml or more and 220 ml or less, more preferably 90 ml or more and 175 ml or less, and further preferably 90 ml or more and 120 ml or less. When more than 220 ml, the denseness of the separator sometimes becomes insufficient, causing the short circuit failure rate to increase. When the modified freeness is less than 75 ml, the fiber length becomes excessively short, thereby reducing the tensile strength. Also, the beaten solvent-spun cellulose fibers become excessively thin, thereby reducing the piercing strength. Thus, internal short circuits sometimes become likely to occur, and productivity sometimes decreases.

The modified freeness is a value measured in accordance with JIS P8121-2:2012, except that an 80 wire mesh having a wire diameter of 0.14 mm and an opening of 0.18 mm was used as a sieve plate, and a sample had a concentration of 0.1% by mass.

The length-weighted average fiber length of the beaten solvent-spun cellulose fibers is preferably 0.2 mm or more and 3.0 mm or less, more preferably 0.2 mm or more and 2.0 mm or less, further preferably 0.2 mm or more and 1.6 mm or less. When the length-weighted average fiber length is less than 0.2 mm, fibers sometimes fall through a mesh strainer during wet laid paper-making resulting in an increased ratio of fibers washed away into drainage water, or fluffing sometimes occurs on the separator surface due to friction. When the length-weighted average fiber length is more than 3.0 mm, fibers sometimes tangle to become lumps resulting in non-uniform thickness.

The length-weighted average fiber length of the solvent-spun cellulose fibers according to the present invention was measured using Kajaani Fiber Lab V3.5 (manufactured by Metso Automation). Kajaani Fiber Lab V3.5 (manufactured by Metso Automation) can measure a true length (L) of an entire bent fiber and a shortest length (1) between both ends of a bent fiber for each fiber passing through a detection unit. The "length-weighted average fiber length" is a length-weighted average fiber length calculated from a projection fiber length which has been measured for the shortest length (1) between both ends of a bent fiber.

The separator for electrochemical elements according to the present invention includes rayon fibers. The rayon fibers used in the present invention is unbeaten fibers. Both the rayon fibers and the solvent-spun cellulose fibers are cellulose-based fibers. The effects of the rayon fibers are as follows. Compression resistance improves, and internal short circuit failures by burrs of an electrode become unlikely to occur. Furthermore, the surface unevenness or flattened shape of the rayon fibers increases the contact surface area between the rayon fibers and the beaten solvent-spun cellulose fibers. In addition, a hydrogen bond between the cellulose-based fibers increases surface strength to suppress feathers.

The fiber diameter of the rayon fibers used in the present invention is 9.5 µm or less, preferably 5.0 µm or more and 9.5 µm or less, further preferably 5.0 µm or more and 8.5 µm or less. When the fiber diameter of the rayon fibers exceeds 9.5 µm, the number of fibers in the thickness direction decreases. Accordingly, required denseness cannot be secured in some cases. Also, unevenness increases, and non-uniformity in thickness is caused on the sheet surface. Accordingly, the tensile strength and surface strength of the separator become likely to decrease. Although even the rayon fibers having a fiber diameter of less than 5.0 µm can also be used, the fiber diameter of the currently available fibers is 5.0 µm or more. The thinner the rayon fibers, the more difficult the stable manufacture, and the higher the price. The fiber diameter of the rayon fibers is a "fiber diameter (hereinafter, sometimes described as a "fiber diameter A")" of a fiber in the state of being contained in the separator. The "fiber diameter A" was calculated as follows.
1) The cross section of a separator is observed through a microscope, and a picture of the fiber cross section is taken.
2) Twenty fibers in which the ratio between the fiber diameter in the vertical direction and the fiber diameter in the horizontal direction in the cross section of the fiber is 1:2 to 2:1 are selected for eliminating obliquely cut fibers.
3) The cross-sectional areas of the selected fibers are measured.
4) Fiber diameters are calculated from the cross-sectional areas based on the assumption that the cross-sectional shape is a perfect circle. An average value of the fiber diameters of twenty fibers is defined to be the "fiber diameter A."

The "fiber diameter (hereinafter, sometimes described as a "fiber diameter R")" of a fiber in a raw material stage is a value calculated from fineness T (dtex) according to the following formula.

$$R = 20 \times \sqrt{(1/\pi)} \times \sqrt{(T/\rho)}$$

T: fineness (dtex)
ρ: specific gravity (g/cm$^3$)

In the present invention, the content of the rayon fibers having a fiber diameter A of 9.5 µm or less relative to all fibers is preferably 10% by mass or more and 25% by mass or less, more preferably 10% by mass or more and 20% by mass or less, further preferably 15% by mass or more and 20% by mass or less. When the content is within the range of 10% by mass or more and 25% by mass or less, there can be obtained a dried fiber web having favorable peeling properties from a Yankee dryer and high surface strength in which surface feathers are rarely generated. When the content exceeds 25% by mass, an intended thickness cannot be sometimes designed, or required denseness cannot be sometimes secured, resulting in the deterioration of leakage currents and internal short circuit failures. On the other hand, when the content is less than 10% by mass, the wet laid fiber web sometimes becomes difficult to pick up from a mesh strainer, the improvement of the surface strength is sometimes insufficient leading to increased likelihood of the generation of surface feathers, or compression resistance sometimes decreases resulting in the deterioration of internal short circuit failure rates.

The fiber length of the rayon fibers is preferably 1 mm or more and 6 mm or less, more preferably 2 mm or more and 5 mm or less, further preferably 3 mm or more and 4 mm or less. When the fiber length exceeds 6 mm, formation failures are sometimes caused, resulting in deteriorated denseness. When the fiber length is less than 1 mm, the mechanical strength of the separator sometimes decreases, resulting in the breakage of the separator during handling or during the assembling of the electrochemical element.

The separator for electrochemical elements according to the present invention is preferably a wet laid nonwoven fabric. The wet laid nonwoven fabric is a dried fiber web obtained by drying a wet laid fiber web. The wet laid nonwoven fabric, which is excellent in uniform dispersibility of fibers, serves as a highly reliable separator for electrochemical elements in which short circuits are unlikely to occur. A wet laid fiber web is formed by a wet laid paper-making method, and is particularly favorable in denseness, short circuit prevention properties, ion transmittance, and surface smoothness.

In the wet laid paper-making method, the wet laid fiber web can be formed by various wet laid paper-making systems. Examples of the wet laid paper-making systems may include a horizontal Fourdrinier system, inclined short wire-type system, cylinder system, uniflow cylinder•uniflow cylinder combination system, uniflow cylinder-suction former combination system, inclined short wire-type•uniflow cylinder combination system, inclined short wire-type•cylinder suction former combination system, horizontal Fourdrinier•uniflow cylinder combination system, and inclined short wire-type-inclined short wire-type combination system.

A raw material slurry may appropriately include, other than a fiber raw material, a dispersant, a thickener, an inorganic filler, an organic filler, an antifoaming agent, and a release agent, as necessary. The solid content concentration of the raw material slurry is preferably about 5% by mass to 0.001% by mass. The raw material slurry is further diluted with water into a prescribed concentration. Then, a wet laid fiber web is formed.

Subsequently, the wet laid fiber web can be dried by a Yankee dryer to manufacture a dried fiber web. The Yankee dryer and a hot air hood-type dryer may be used in combination. It is noted that the drying temperature is in the range of 90° C. or higher and 160° C. or lower depending on drying ability and paper-making speed. When the surface temperature of the Yankee dryer is low, the release properties of the dried fiber web are favorable. The surface of the Yankee dryer can be coated with an appropriate amount of a release agent. When the surface of the Yankee dryer is mirror, the release properties of the dried fiber web are favorable. Although the dried fiber web itself may be used as the separator for electrochemical elements, it may be subjected to a calender treatment, a heat calender treatment, a heat treatment, and the like as necessary to be used as the separator for electrochemical elements.

The thickness of the separator for electrochemical elements is preferably 10 μm or more and 50 μm or less, more preferably 20 μm or more and 45 μm or less, further preferably 25 μm or more and 40 μm or less. When less than 10 μm, sufficient mechanical strength cannot be sometimes obtained, the insulation between the positive electrode and the negative electrode is sometimes insufficient resulting in the increase of internal short circuit failure rates and variations in discharge properties, and the capacity retention rate and the cycle properties sometimes deteriorate. When more than 50 μm, the internal resistance of the electrochemical element sometimes increases, and the discharge properties sometimes decrease.

The basis weight of the separator for electrochemical elements is preferably 7 g/m² or more and 24 g/m² or less, more preferably 10 g/m² or more and 20 g/m² or less, further preferably 12 g/m² or more and 18 g/m² or less. When less than 7 g/m², sufficient mechanical strength cannot be sometimes obtained, and the insulation between the positive electrode and the negative electrode is sometimes insufficient resulting in the increase of internal short circuit failure rates and variations in discharge properties. When more than 24 g/m², the internal resistance of the electrochemical element sometimes increases, and the discharge properties sometimes decrease.

The tensile strength of the separator according to the present invention is preferably 267 N/m or more, more preferably 333 N/m or more. When less than 267 N/m, the separator sometimes breaks during winding and the like. The upper limit of the tensile strength is not particularly limited. However, when the basis weight of the separator is 24 g/m² or less, the tensile strength often becomes 1200 N/m or less.

The maximum pore diameter defined by ASTM F316-86 of the separator according to the present invention is preferably 0.5 μm or more and 3.0 μm or less, more preferably 1.0 μm or more and 2.5 μm or less. When the maximum pore diameter is less than 0.5 μm, the permeability of the liquid electrolyte sometimes deteriorates. When the maximum pore diameter is larger than 3.0 μm, pinholes are sometimes generated in the separator resulting in the increase of internal short circuit failure rates and variations in discharge properties. The average pore diameter of the separator according to the present invention is preferably 0.2 μm or more and 0.9 μm or less, more preferably 0.3 μm or more and 0.8 μm or less. When the average pore diameter is less than 0.2 μm, the permeability of the liquid electrolyte sometimes deteriorates. When the average pore diameter exceeds 0.9 μm, pinholes are sometimes generated in the separator resulting in the increase of internal short circuit failure rates and self-discharge.

EXAMPLES

Although the present invention will be described in further detail below by examples, the present invention is not limited to these examples. It is noted that parts and percentages in these examples are all based on mass, unless otherwise stated.

Separator for Capacitors

Example 1

There were mixed 15 parts of rayon fibers having a fineness of 0.8 dtex and a fiber length of 3 mm and 85 parts of beaten solvent-spun cellulose fibers having a modified freeness of 90 ml. The mixture was disaggregated in water of a pulper to prepare a uniform raw material slurry (0.3% concentration) under stirring by an agitator. The beaten solvent-spun cellulose fibers were obtained by refining solvent-spun cellulose fibers having a fiber diameter R of 10 μm and a fiber length of 4 mm using a refiner. From the raw material slurry, a wet laid fiber web was obtained using an inclined short wire-type paper-making machine. Using a Yankee dryer (temperature: 120° C.) and a hot air hood-type dryer (temperature: 120° C.) disposed on the top surface of the Yankee dryer, the wet laid fiber web was dried to obtain a dried fiber web. Thereafter, the dried fiber web was subjected to a calender treatment with a metal roll and an elastic roll to obtain a separator having a basis weight of 17.3 g/m² and a thickness of 30.4 μm. The fiber diameter A of the rayon fibers was 8.1 μm.

Example 2

A separator having a basis weight of 17.4 g/m² and a thickness of 30.2 μm was obtained in a similar manner to Example 1, except that 25 parts of rayon fibers and 75 parts of beaten solvent-spun cellulose fibers were used.

Example 3

A separator having a basis weight of 17.2 g/m² and a thickness of 30.1 μm was obtained in a similar manner to Example 1, except that 10 parts of rayon fibers and 90 parts of beaten solvent-spun cellulose fibers were used.

Example 4

A separator having a basis weight of 17.1 g/m² and a thickness of 30.1 µm was obtained in a similar manner to Example 2, except that the fineness of rayon fibers was 0.3 dtex. The fiber diameter A of the rayon fibers was 5.3 µm.

Example 5

A separator having a basis weight of 17.2 g/m² and a thickness of 30.2 µm was obtained in a similar manner to Example 2, except that the fineness of rayon fibers was 0.9 dtex. The fiber diameter A of the rayon fibers was 9.0 µm.

Example 6

A separator having a basis weight of 17.1 g/m² and a thickness of 30.1 µm was obtained in a similar manner to Example 3, except that 9 parts of rayon fibers and 91 parts of beaten solvent-spun cellulose fibers were used.

Example 7

A separator having a basis weight of 17.2 g/m² and a thickness of 30.3 µm was obtained in a similar manner to Example 5, except that 26 parts of rayon fibers and 74 parts of beaten solvent-spun cellulose fibers were used.

Example 8

A separator having a basis weight of 17.1 g/m² and a thickness of 30.2 µm was obtained in a similar manner to Example 2, except that the fineness of rayon fibers was 1.0 dtex. The fiber diameter A of the rayon fibers was 9.4 µm.

Example 9

A separator having a basis weight of 17.2 g/m² and a thickness of 30.1 µm was obtained in a similar manner to Example 1, except that the modified freeness of beaten solvent-spun cellulose fibers was 120 ml.

Example 10

A separator having a basis weight of 17.4 g/m² and a thickness of 30.0 µm was obtained in a similar manner to Example 1, except that the modified freeness of beaten solvent-spun cellulose fibers was 210 ml.

Comparative Example 1

A separator having a basis weight of 18.1 g/m² and a thickness of 30.1 µm was obtained in a similar manner to Example 1, except that 0 part of rayon fibers and 100 parts of beaten solvent-spun cellulose fibers were used.

Comparative Example 2

A separator having a basis weight of 17.2 g/m² and a thickness of 30.3 µm was obtained in a similar manner to Example 2, except that the fineness of rayon fibers was 1.1 dtex. The fiber diameter A of the rayon fibers was 9.7 µm.

Comparative Example 3

A separator having a basis weight of 18.2 g/m² and a thickness of 30.3 µm was obtained in a similar manner to Example 2, except that 25 parts of oriented crystallized polyethylene terephthalate (PET)-based synthetic fibers having a fineness of 0.1 dtex and a fiber length of 3 mm were used instead of rayon fibers. The fiber diameter A of the PET-based fibers was 3.1 µm.

Comparative Example 4

A separator having a basis weight of 17.5 g/m² and a thickness of 30.4 µm was obtained in a similar manner to Example 2, except that solvent-spun cellulose fibers having a fiber length of 4 mm in an unbeaten state without refinement were used instead of rayon fibers. The fiber diameter A of the solvent-spun cellulose fibers was 9.3 µm.

Comparative Example 5

A separator having a basis weight of 17.3 g/m² and a thickness of 30.1 µm was obtained in a similar manner to Example 2, except that 25 parts of acryl fibers having a fineness of 0.1 dtex and a fiber length of 3 mm was used instead of rayon fibers. The fiber diameter A of the acryl fibers was 2.6 µm.

Comparative Example 6

A separator having a basis weight of 17.6 g/m² and a thickness of 30.2 µm was obtained in a similar manner to Example 2, except that polypropylene (PP) fibers having a fineness of 0.8 dtex and a fiber length of 5 mm was used instead of rayon fibers. The fiber diameter A of the PP fibers was 10.6 µm.

Separator for Lithium Secondary Batteries

Example 11

There were mixed 15 parts of rayon fibers having a fineness of 0.3 dtex and a fiber length of 3 mm and 85 parts of beaten solvent-spun cellulose fibers having a modified freeness of 90 ml. The mixture was disaggregated in water of a pulper to prepare a uniform raw material slurry (0.3% concentration) under stirring by an agitator. The beaten solvent-spun cellulose fibers were obtained by refining solvent-spun cellulose fibers having a fiber diameter R of 10 µm and a fiber length of 4 mm with a refiner. From the raw material slurry, a wet laid fiber web was obtained using an inclined short wire-type paper-making machine. Using a Yankee dryer (temperature: 120° C.) and a hot air hood-type dryer (temperature: 120° C.) disposed on the top surface of the Yankee dryer, the wet laid fiber web was dried to obtain a dried fiber web. Thereafter, the dried fiber web was subjected to a calender treatment with a metal roll and an elastic roll to obtain a separator having a basis weight of 9.3 g/m² and a thickness of 14.5 µm. The fiber diameter A of the rayon fibers was 5.3 µm.

Example 12

A separator having a basis weight of 9.2 g/m² and a thickness of 14.2 µm was obtained in a similar manner to Example 11, except that the fineness of rayon fibers was 0.8 dtex. The fiber diameter A of the rayon fibers was 8.2 µm.

Example 13

A separator having a basis weight of 9.4 g/m² and a thickness of 14.0 µm was obtained in a similar manner to Example 11, except that the fineness of rayon fibers was 0.9 dtex. The fiber diameter A of the rayon fibers was 9.0 µm.

Example 14

A separator having a basis weight of 9.2 g/m² and a thickness of 14.2 µm was obtained in a similar manner to Example 11, except that 10 parts of rayon fibers and 90 parts of beaten solvent-spun cellulose fibers were used.

Example 15

A separator having a basis weight of 9.2 g/m² and a thickness of 14.1 µm was obtained in a similar manner to Example 11, except that 25 parts of rayon fibers and 75 parts of beaten solvent-spun cellulose fibers were used.

Example 16

A separator having a basis weight of 9.4 g/m² and a thickness of 14.1 µm was obtained in a similar manner to Example 11, except that beaten solvent-spun cellulose fibers obtained by refining solvent-spun cellulose fibers having a fiber diameter R of 10 µm and a fiber length of 4 mm with a refiner and beating the refined solvent-spun cellulose fibers into a modified freeness of 210 ml were used.

Example 17

A separator having a basis weight of 9.4 g/m² and a thickness of 14.0 µm was obtained in a similar manner to Example 11, except that the modified freeness of beaten solvent-spun cellulose fibers was 230 ml.

Comparative Example 7

A separator having a basis weight of 9.5 g/m² and a thickness of 14.8 µm was obtained in a similar manner to Example 11, except that the fineness of rayon fibers was 1.1 dtex. The fiber diameter A of the rayon fibers was 9.6 µm.

Comparative Example 8

A separator having a basis weight of 9.3 g/m² and a thickness of 14.2 µm was obtained in a similar manner to Example 15, except that 25 parts of oriented crystallized PET-based synthetic fibers having a fineness of 0.1 dtex and a fiber length of 3 mm was used instead of rayon fibers. The fiber diameter A of the PET-based synthetic fibers was 3.1 µm.

The separators according to Examples and Comparative Examples were measured and evaluated as below. The results of the separators for capacitors are shown in Table 1, and the results of the separators for lithium ions are shown in Table 2. In Table 1 and Table 2, "fiber diameter A" is the fiber diameter A of rayon fibers, PET-based synthetic fibers, solvent-spun cellulose fibers in an unbeaten state, acryl fibers, or PP fibers.

[Basis Weight]

The basis weight was measured in accordance with JIS P8124.

[Thickness]

The thickness at a load of 5 N was measured by an external micrometer defined in JIS B7502.

[Separator Strength]

Using a desktop material tester (manufactured by Orientec Co., Ltd., trade name STA-1150), the tensile strength in the longitudinal direction was measured to evaluate separator strength in accordance with JIS P8113. The size of a test piece was 250 mm in the longitudinal direction and 50 mm in width, the distance between two grippers was 100 mm, and the pulling speed was 300 mm/min.

[Measurement of Pore Diameter]

Using Perm-Porometer CFP-1500A manufactured by PMI, measurement was performed in accordance with JIS K3832, ASTM F316-86, and ASTM E1294-89 to measure the maximum pore diameter of each separator.

[Surface Strength]

The Yankee dryer surface (Yankee surface) and the hot air hood-type dryer surface (hood surface) of the separator were rubbed with an index finger 20 times, and a test was performed in which the generation of feathers was visually observed. Evaluation was performed according to the criteria below. This test was performed by 10 persons, and an average thereof was presented. In judgments "B" and "A", problems attributable to feathers were not raised in the process. Even in judgments "C" and "D", the separator can be sometimes used by optimizing the type of a roll attached to manufacturing facilities, adjusting tension, and adjusting the feed (unwinding) direction of the separator. Adjusting the feed direction indicates adjusting which of the Yankee surface and the hood surface is faced upward.

A: Fiber residues due to feathers did not adhere to an index finger.

B: Fiber residues due to feathers hardly adhered to an index finger.

C: Fiber residues due to feathers slightly adhered to an index finger.

D: Fiber residues due to feathers adhered to an index finger.

<Preparation of Capacitor>

There were mixed and kneaded 85% by mass of activated carbon having an average particle size of 6 µm as an electrode active material, 7% by mass of carbon black as a conducting agent, and 8% by mass of polytetrafluoroethylene as a binder to prepare a sheet-like electrode having a thickness of 0.2 mm. This was bonded to both surfaces of an aluminum foil sheet having a thickness of 50 µm through a conductive adhesive. The resultant product was rolled to prepare an electrode having an effective electrode surface area of 105 mm in width and 19.9 µm in length. The prepared electrode was used as a positive electrode and a negative electrode. A positive electrode, a separator for capacitors slit into a width of 110 mm and a length of 20 µm, and a negative electrode were stacked in this order. The stacked product was wound into a spiral type using a winding machine to prepare a cylindrical type (spiral type) element. A separator was disposed to the outermost layer on each of the positive electrode side and the negative electrode side. The prepared element was housed in an aluminum case. A positive lead and a negative lead were welded to a positive terminal and a negative terminal attached to the case respectively. Thereafter, the case was sealed except for a liquid electrolyte inlet. The case containing the element was heated at 140° C. for 12 hours for a drying treatment. After the case was left to cool down to room temperature, a liquid electrolyte was injected into the case. Subsequently, the inlet was sealed to prepare a capacitor. As the liquid electrolyte, there was used a solution in which $(C_2H_5)_3(CH_3)NBF_4$ was dissolved in PC such that 1.5 mol/l was obtained.

[Internal Short Circuit Failure Rate]

The capacitor was applied with a DC voltage of 2.5 V for 72 hours, and thereafter charged to 2.5 V. The leakage current immediately after the charge was measured. The capacitor with an observed leakage current of 10 mA or more was regarded as having an "internal short circuit failure". The internal short circuit failure rate per 500 capacitors was calculated. The lower internal short circuit failure rate is preferable.

<Preparation of Lithium Ion Secondary Battery>

There were mixed 95% by mass of spinel-structure lithium titanate represented by $Li_4Ti_5O_{12}$ having an average particle size of 0.7 μm and an Li occlusion potential of 1.55 V as a negative electrode active material, 2.5% by mass of acetylene black as a conducting agent, and 2.5% by mass of polyvinylidene fluoride as a binder. This was dispersed in N-methyl-2-pyrrolidone to prepare a slurry. The slurry was applied onto both surfaces of an aluminum foil sheet having a thickness of 15 μm. The resultant product was rolled, and thereafter dried under vacuum at 150° C. for 2 hours to prepare a negative electrode for lithium ion secondary batteries having a thickness of 100 μm.

Next, there were mixed 90% by mass of lithium cobalt oxide ($LiCoO_2$) powders as a positive electrode active material, 3% by mass of acetylene black and 3% by mass of graphite as a conducting agent, and 4% by mass of polyvinylidene fluoride as a binder. This was dispersed in N-methyl-2-pyrrolidone to prepare a slurry. The prepared slurry was applied onto both surfaces of a current collector including an aluminum foil sheet having a thickness of 15 μm. The resultant product was rolled, and thereafter dried under vacuum at 150° C. for 2 hours to prepare a positive electrode for lithium ion secondary batteries having a thickness of 100 μm.

Next, a positive terminal and a negative terminal were connected to current collectors of the positive electrode and the negative electrode respectively. The positive electrode, the separator for lithium secondary batteries, the negative electrode, and the separator for lithium secondary batteries were stacked in this order to obtain a stacked product. The stacked product was wound such that the terminals of the positive electrode and the negative electrode became at right angles to the longitudinal direction (flow direction) of the separator. Accordingly, a wound product was obtained. Subsequently, the obtained wound product was hot pressed at 90° C. to prepare a wound flat-type (flattened type) electrode group (element) having a dimension of 70×100 mm and a thickness of 3.0 mm. Subsequently, there was prepared a pack (bag-like sheath member) including a laminated film with a thickness of 0.1 mm constituted by an aluminum foil sheet with a thickness of 40 μm having a polyethylene film on both surfaces. The electrode group was housed in the bag-like sheath member in such a manner that the terminals of the positive electrode and the negative electrode externally extended from an opening of the sheath member, and dried under vacuum at 80° C. for 24 hours. Next, a liquid electrolyte was injected into the bag-like sheath member. Thereafter, the opening (liquid inlet) of the bag-like sheath member was completely sealed by heat sealing to prepare a lithium ion secondary battery. As the liquid electrolyte, there was used a solution containing 1.5 mol/L of $LiBF_4$ as an electrolyte dissolved in a mixed solvent of EC and GBL (volume ratio 25:75).

[Internal Short Circuit Failure Rate]

After the electrode group was housed in the bag-like sheath member and dried under vacuum at 80° C. for 24 hours and before the liquid electrolyte was injected in the above description, the conduction between the electrodes was checked by a tester to confirm the presence or absence of short circuits. The internal short circuit failure rate (%) was calculated according to formula "the number of shorts/the number of all electrode groups (500)×100" based on tested 500 electrode groups. The lower internal short circuit failure rate is preferable.

TABLE 1

|  | Fiber diameter A μm | Basis weight g/m² | Thickness μm | Tensile strength Vertical N/m | Maximum pore diameter μm | Surface strength Yankee surface | Surface strength Hood surface | Internal short circuit failure rate % |
|---|---|---|---|---|---|---|---|---|
| Example 1 | 8.1 | 17.3 | 30.4 | 755 | 1.3 | A | A | 0.2 |
| Example 2 | 8.1 | 17.4 | 30.2 | 718 | 2.5 | A | A | 0.2 |
| Example 3 | 8.1 | 17.2 | 30.1 | 768 | 1.1 | B | B | 0.4 |
| Example 4 | 5.3 | 17.1 | 30.1 | 792 | 1.5 | A | A | 0.0 |
| Example 5 | 9.0 | 17.2 | 30.2 | 712 | 2.8 | B | B | 0.6 |
| Example 6 | 8.1 | 17.1 | 30.1 | 770 | 1.1 | C | B | 0.6 |
| Example 7 | 9.0 | 17.2 | 30.3 | 690 | 2.9 | C | B | 0.8 |
| Example 8 | 9.4 | 17.1 | 30.2 | 655 | 3.0 | C | B | 1.0 |
| Example 9 | 8.1 | 17.2 | 30.1 | 680 | 1.9 | A | A | 0.2 |
| Example 10 | 8.1 | 17.4 | 30.0 | 630 | 2.9 | B | A | 0.8 |
| Comparative Example 1 | — | 18.1 | 30.1 | 813 | 0.8 | C | B | 1.2 |
| Comparative Example 2 | 9.7 | 17.2 | 30.3 | 640 | 3.5 | D | B | 2.0 |
| Comparative Example 3 | 3.1 | 18.2 | 30.3 | 769 | 1.2 | D | B | 0.2 |
| Comparative Example 4 | 9.3 | 17.5 | 30.4 | 612 | 3.0 | D | B | 1.4 |
| Comparative Example 5 | 2.6 | 17.3 | 30.1 | 880 | 1.1 | D | B | 0.2 |
| Comparative Example 6 | 10.6 | 17.6 | 30.2 | 584 | 3.5 | D | B | 2.2 |

The separators according to Examples 1 to 10 are a separator for capacitors which includes beaten solvent-spun cellulose fibers and rayon fibers having a fiber diameter of 9.5 μm or less. According to the separators of Examples 1 to 10, the adhesion effect by the entanglement between fibers and hydrogen bonds enhanced surface strength, and also improved the peeling properties of the dried fiber web from a Yankee dryer. Therefore, feathers were unlikely to be generated. Also, the maximum pore diameter could be maintained within the preferable range, with the result that the internal short circuit failure rate was low. Thus, the separators were favorable.

In contrast to this, the separator for capacitors according to Comparative Example 1 did not include rayon fibers having a fiber diameter of 9.5/m or less and included only beaten solvent-spun cellulose fibers. Therefore, feathers were generated when the dried fiber web peeled from a Yankee dryer, with the result that the surface strength of the Yankee surface was weak. Also, since the compression resistance decreases, the internal short circuit failure rate increased.

Also, in the separator for capacitors according to Comparative Example 2, the fiber diameter of rayon fibers was 9.7 μm, which exceeded 9.5 μm. Therefore, the amount of the trapped beaten solvent-spun cellulose fibers was not sufficient. Thus, the generation of feathers could not be suppressed even when the optimization of the type of a roll attached to capacitor manufacturing facilities, the adjustment of tension, the adjustment of the feed direction of a paper surface, and the like were performed. Also, tensile strength decreased, and the maximum pore diameter enlarged. Consequently, the internal short circuit failure rate deteriorated.

The separators for capacitors according to Comparative Examples 3, 5, and 6 are a separator including synthetic fibers such as oriented crystallized PET-based fibers, acryl fibers, and PP fibers, instead of the rayon fibers having a fiber diameter of 9.5 μm or less. Since synthetic fibers and beaten solvent-spun cellulose fibers bind with each other by only the entanglement between fibers, feathers are easily generated when the dried fiber web peels from a Yankee dryer. Thus, the surface strength of the Yankee surface decreased. Also, it was observed that feather lumps with synthetic fibers as cores tended to be easily generated against friction of, for example, the roll attached to capacitor manufacturing facilities. Furthermore, in the separator for capacitors including synthetic fibers having a fiber diameter of 10.6 μm according to Comparative Example 6, the maximum pore diameter enlarged, with the result that the internal short circuit failure rate deteriorated.

The separator for capacitors according to Comparative Example 4 is a separator including unbeaten fibers of solvent-spun cellulose fibers having a fiber diameter of 9.3 m, instead of rayon fibers having a fiber diameter of 9.5 μm or less. When the fiber diameter is approximately the same, solvent-spun cellulose fibers, which are a cellulose having high crystallization degree, have higher stiffness than rayon fibers. Accordingly, the solvent-spun cellulose fibers maintain a cross-sectional shape close to a circle and adhere at points, even when pressed in the wet laid paper-making process. Therefore, when the separator including rayon fibers having a fiber diameter of 9.4 μm according to Example 8 and the separator including solvent-spun cellulose fibers having a fiber diameter of 9.3 μm according to Comparative Example 4 are compared, the separator according to Comparative Example 4 has a reduced amount of trapped beaten solvent-spun cellulose fibers, with the result that feathers are easily generated when the dried fiber web peels from a Yankee dryer. Thus, the surface strength decreased.

The separators for capacitors according to Examples 1 to 3 and 6 are a separator including rayon fibers having a fiber diameter of 8.1 μm. When compared to the separator having a rayon fiber content relative to all fibers of less than 10% by mass according to Example 6, the separators having a rayon fiber content of 10 to 25% by mass according to Examples 1 to 3 had higher surface strength due to the adhesion effect by the entanglement between fibers and hydrogen bonds, resulting in enhanced peeling properties of the dried fiber web from a Yankee dryer. Therefore, feathers were hardly generated. Also, the maximum pore diameter could be maintained within the preferable range, with the result that the internal short circuit failure rate was low. Thus, the separators according to Examples 1 to 3 were favorable. In the separator according to Example 6, which has a rayon fiber content of less than 10% by mass, the amount of trapped beaten solvent-spun cellulose fibers was insufficient. Accordingly, when compared to the separator according to Example 3, feathers tended to be somewhat generated when the dried fiber web peeled from a Yankee dryer. Thus, the surface strength somewhat decreased. Consequently, the optimization of the type of a roll attached to manufacturing facilities, the adjustment of tension, the adjustment of the feed direction of a paper surface, and the like were necessary.

The separators for capacitors according to Examples 5 and 7 are a separator including rayon fibers having a fiber diameter of 9.0 μm. In the separator having a rayon fiber content relative to all fibers of 25% by mass according to Example 5, when compared to the separator having a rayon fiber content of more than 25% by mass according to Example 7, feathers were unlikely to be generated on the Yankee surface, the maximum pore diameter was small, and the internal short circuit failure rate was low. Thus, the separator according to Example 5 was favorable. In the separator according to Example 7, when compared to the separator according to Example 5, the smoothness of the dried fiber web decreases, and the surface is likely to feel rough when rubbed, with the result that feathers are somewhat generated. Thus, the surface strength somewhat decreased. Consequently, the optimization of the type of a roll attached to manufacturing facilities, the adjustment of tension, the adjustment of the feed direction of a paper surface, and the like were necessary. Also, in the separator according to Example 7, when compared to the separator according to Example 5, the maximum pore diameter was larger, and the internal short circuit failure rate somewhat increased.

The separators for capacitors according to Examples 2, 4, 5, and 8 are a separator having a rayon fiber content relative to all fibers of 25% by mass. As the rayon fibers became thicker, the surface strength decreased. Also, the tensile strength decreased, the maximum pore diameter enlarged, and the internal short circuit failure rate increased. In the separators including rayon fibers having a fiber diameter of 5.0 μm or more and 8.5 μm or less according to Examples 2 and 4, when compared to the separators including rayon fibers having a fiber diameter of 9.0 μm and 9.4 μm according to Examples 5 and 8 respectively, feathers were unlikely to be generated, and the internal short circuit failure rate was low. Thus, the separators according to Examples 2 and 4 were favorable.

The separators for capacitors according to Examples 1, 9, and 10 are a separator including 15 parts by mass of rayon fibers having a fiber diameter of 8.1 μm and 85 parts by mass of beaten solvent-spun cellulose fibers. Due to the fact that the modified freeness of beaten solvent-spun cellulose fibers is 75 ml or more and 220 ml or less, the adhesion strength increased by the entanglement between beaten solvent-spun cellulose fibers and rayon fibers and hydrogen bonds. Accordingly, the peeling properties of the dried fiber web from a Yankee dryer were favorable, and feathers were hardly generated. The larger the modified freeness of beaten solvent-spun cellulose fibers, the less frequent the entanglement between beaten solvent-spun cellulose fibers and rayon fibers. Therefore, the tensile strength decreases. Also, since thick solvent-spun cellulose fibers remain, the maximum pore diameter enlarges. Thus, it was observed that the internal short circuit failure rate tended to increase.

TABLE 2

|  | Fiber diameter A μm | Basis weight g/m² | Thickness μm | Tensile strength Vertical N/m | Maximum pore diameter μm | Surface strength Yankee surface | Surface strength Hood surface | Internal short circuit failure rate % |
|---|---|---|---|---|---|---|---|---|
| Example 11 | 5.3 | 9.3 | 14.5 | 429 | 2.0 | A | A | 0.2 |
| Example 12 | 8.2 | 9.2 | 14.2 | 375 | 2.6 | A | A | 0.2 |
| Example 13 | 9.0 | 9.4 | 14.0 | 360 | 2.9 | B | A | 0.4 |
| Example 14 | 5.3 | 9.2 | 14.2 | 440 | 1.8 | B | B | 0.2 |
| Example 15 | 5.3 | 9.2 | 14.1 | 370 | 2.7 | A | A | 0.2 |
| Example 16 | 5.3 | 9.4 | 14.1 | 340 | 3.0 | A | A | 0.6 |
| Example 17 | 5.3 | 9.4 | 14.0 | 310 | 3.7 | C | B | 1.6 |
| Comparative Example 7 | 9.6 | 9.5 | 14.8 | 320 | 3.2 | D | B | 1.2 |
| Comparative Example 8 | 3.1 | 9.3 | 14.2 | 440 | 2.0 | D | B | 0.2 |

The separators for lithium secondary batteries according to Examples 11 to 16 are a separator including beaten solvent-spun cellulose fibers and rayon fibers having a fiber diameter of 9.5 μm or less. In the separators according to Examples 11 to 16, the surface strength increased due to the adhesion effect by the entanglement between constituent fibers and hydrogen bonds, and the peeling properties of the dried fiber web from a Yankee dryer also improved. Therefore, feathers were unlikely to be generated. Also, the maximum pore diameter could be maintained within the preferable range, with the result that the internal short circuit failure rate was low. Thus, the separators were favorable.

In the separator for lithium ions according to Comparative Example 7, the fiber diameter of rayon fibers was 9.6 μm, which exceeded 9.5 μm. Accordingly, the amount of trapped beaten solvent-spun cellulose fibers was not sufficient. Thus, the generation of feathers could not be suppressed even when the optimization of the type of a roll attached to battery manufacturing facilities, the adjustment of tension, the adjustment of the feed direction of a paper surface, and the like were performed. Also, the tensile strength decreased, the maximum pore diameter enlarged, and the internal short circuit failure rate deteriorated.

The separator for lithium ions according to Comparative Example 8 is a separator including oriented crystallized PET-based fibers (synthetic fibers) having a fiber diameter of 3.1 μm instead of the rayon fibers having a fiber diameter of 9.5 μm or less. Since synthetic fibers and beaten solvent-spun cellulose fibers bind with each other by only the entanglement between fibers, feathers are easily generated when the dried fiber web peels from a Yankee dryer. Thus, the surface strength of the Yankee surface decreased.

The separators for lithium ions according to Examples 11, 16, and 17 are a separator including 15 parts by mass of rayon fibers having a fiber diameter of 5.3 μm and 85 parts by mass of beaten solvent-spun cellulose fibers. In the separators according to Examples 11 and 16, the modified freeness of the beaten solvent-spun cellulose fibers is 75 ml or more and 220 ml or less. In the separator according to Example 17, the modified freeness of the beaten solvent-spun cellulose fibers is 230 ml, which exceeds 220 ml. In the separators including solvent-spun cellulose fibers having a modified freeness of 75 ml or more and 220 ml or less according to Examples 11 and 16, the adhesion strength increased due to the entanglement between beaten solvent-spun cellulose fibers and rayon fibers and hydrogen bonds. Accordingly, the peeling properties of the dried fiber web from a Yankee dryer were favorable, and feathers were hardly generated. On the other hand, in the separator having a modified freeness of more than 220 ml according to Example 17, the entanglement between beaten solvent-spun cellulose fibers and rayon fibers decreases. Therefore, the tensile strength decreases. Also, since the thick solvent-spun cellulose fibers remain, the maximum pore diameter enlarges. Thus, the internal short circuit failure rate increased.

In this manner, in the separator for electrochemical elements including beaten solvent-spun cellulose fibers and rayon fibers having a fiber diameter of 9.5 μm or less, there can be obtained a separator for electrochemical elements in which the generation of feathers can be suppressed, the surface strength is high, and the internal short circuit failure rate is low.

INDUSTRIAL APPLICABILITY

The separator for electrochemical elements according to the present invention can be applied to electric double layer capacitors, hybrid capacitors, redox capacitors, lithium secondary batteries, and the like.

The invention claimed is:

1. A separator for electrochemical elements comprising beaten solvent-spun cellulose fibers and rayon fibers having a fiber diameter of 9.5 μm or less, wherein:
   the beaten solvent-spun cellulose fibers have a modified freeness of 75 ml or more and 220 ml or less, and
   the rayon fibers have a fiber length of 1 mm or more and 6 mm or less.

2. The separator for electrochemical elements according to claim 1, wherein the content of the rayon fibers relative to all fibers is 10% by mass or more and 25% by mass or less.

3. The separator for electrochemical elements according to claim 1, wherein the rayon fibers have a fiber diameter of 5.0 μm or more and 9.5 μm or less.

4. The separator for electrochemical elements according to claim 1, wherein the rayon fibers have a fiber diameter of 5.0 μm or more and 8.5 μm or less.

5. An electrochemical element comprising the separator for electrochemical elements according to claim 1.

6. The separator for electrochemical elements according to claim 1, wherein the content of the rayon fibers relative to all fibers is 10% by mass or more and 20% by mass or less.

7. The separator for electrochemical elements according to claim 1, wherein the content of the rayon fibers relative to all fibers is 15% by mass or more and 20% by mass or less.

8. The separator for electrochemical elements according to claim 1, wherein the beaten solvent-spun cellulose fibers have a modified freeness of 90 ml or more and 175 ml or less.

9. The separator for electrochemical elements according to claim 1, wherein the beaten solvent-spun cellulose fibers have a modified freeness of 90 ml or more and 120 ml or less.

10. The separator for electrochemical elements according to claim 1, wherein the separator has a basis weight of 7 $g/m^2$ or more and 24 $g/m^2$ or less.

11. The separator for electrochemical elements according to claim 1, wherein the separator has a basis weight of 12 $g/m^2$ or more and 18 $g/m^2$ or less.

12. The separator for electrochemical elements according to claim 1, wherein the separator has a thickness of 10 µm or more and 50 µm or less.

13. The separator for electrochemical elements according to claim 1, wherein the separator has a thickness of 25 µm or more and 40 µm or less.

14. The separator for electrochemical elements according to claim 1, wherein the beaten solvent-spun cellulose fibers has a length-weighted average fiber length of 0.2 mm or more and 3.0 mm or less.

15. The separator for electrochemical elements according to claim 1, wherein the beaten solvent-spun cellulose fibers has a length-weighted average fiber length of 0.2 mm or more and 1.6 mm or less.

16. The separator for electrochemical elements according to claim 1, wherein the rayon fibers have a fiber length of 3 mm or more and 4 mm or less.

\* \* \* \* \*